United States Patent
Sanchez et al.

(10) Patent No.: US 6,593,674 B2
(45) Date of Patent: Jul. 15, 2003

(54) VIBRATION ISOLATOR AND ACTUATOR INCORPORATING SAME FOR ISOLATING INTEGRAL ELECTRONICS

(75) Inventors: George Sanchez, Fort Collins, CO (US); Brett R. Berlin, Fort Collins, CO (US); Gregory J. Broadsack, Loveland, CO (US); Jon S. Pointer, Fort Collins, CO (US); Henri A. Siedow, Fort Collins, CO (US); Gary A. Warwick, Fort Collins, CO (US); Richard J. Way, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 0 days.

(21) Appl. No.: 09/793,225

(22) Filed: Feb. 26, 2001

(65) Prior Publication Data

US 2002/0117908 A1 Aug. 29, 2002

(51) Int. Cl.[7] .............................. H02K 5/24; H02K 5/00
(52) U.S. Cl. ........................ 310/89; 310/51; 310/68 R
(58) Field of Search ........................ 310/112, 89, 75 R, 310/67 R, DIG. 6, 51, 68 R, 91; 248/638

(56) References Cited

U.S. PATENT DOCUMENTS

| | | | | |
|---|---|---|---|---|
| 4,668,898 A | * | 5/1987 | Harms et al. | 310/227 |
| 4,885,440 A | * | 12/1989 | Kachuk | 200/557 |
| 4,988,905 A | * | 1/1991 | Tolmie, Jr. | 310/68 B |
| 5,006,744 A | * | 4/1991 | Archer et al. | 310/89 |
| 5,789,829 A | * | 8/1998 | Heesemann | 310/51 |
| 6,236,126 B1 | * | 5/2001 | Yagi et al. | 310/261 |
| 6,274,957 B1 | * | 8/2001 | Mahn et al. | 29/596 |
| 6,348,753 B1 | * | 2/2002 | Sakai et al. | 310/191 |

* cited by examiner

Primary Examiner—Burton Mullins
(74) Attorney, Agent, or Firm—Leydig, Voit & Mayer, Ltd.

(57) ABSTRACT

A rotary electrical actuator for mounting to a support surface in industrial applications having integral electronics that are isolated by vibration isolators from vibrations. The rotary actuator comprises a stator housing supporting a lamination stack and coils. The actuator housing has a mounting structure for mounting to the support surface (such as the mounting surface of an engine or a turbine for example) for support thereby. A rotor is carried for rotation in the stator housing. The actuator further comprises an electronics housing containing the electronics that control output of the electrical actuator. Vibration isolators supported by the stator housing in turn support the electronics housing, whereby vibrations received at mounting structure and traveling through the stator housing are dampened prior to traveling to the electronics housing. A number of embodiments are disclosed utilizing a tie rod assembly concept for the vibration isolators.

29 Claims, 5 Drawing Sheets

VIBRATION ISOLATOR AND ACTUATOR INCORPORATING SAME FOR ISOLATING INTEGRAL ELECTRONICS

FIELD OF THE INVENTION

The present invention generally relates to electrical actuators, and more specifically to isolating electronics used for actuators for industrial applications such as for an engine or a turbine.

BACKGROUND OF THE INVENTION

Electrical actuators are commonly used in industry applications for implementing control over engine or turbine parameters. For example, electrical actuators may be used to position a butterfly valve that controls fluid flow through a turbine. One significant environmental consideration in such industrial applications is that turbines and engines produce a significant amount of vibration during operation. Because electrical actuators are typically mounted directly to the turbine or engine via mating flanges or brackets, vibrations are transmitted from the engine or turbine directly to the electrical actuator. However, it is desirable not to subject the electronics for controlling electrical actuators to such engine or turbine induced vibrations as such vibrations can cause failures or reliability problems in the electronics thus shortening the lifespan.

One prior art attempt of dealing with this problem has been to mount the electronics at a remote location isolated from the vibrations. However, this is undesirable for the customer as two separate assemblies must be separately mounted, proper wiring and electrical connections of the separate assemblies is required, and valuable space is used. For these and other reasons, it is desirable to incorporate the electronics integrally into the electrical actuator. Such desires to have integral electronics are not easily reconciled with the environmental difficulties associated with vibrations. Such engine or turbine induced vibrations have a potential detrimental effect on actuator electronics. A desire thus exists for a solution to this problem.

SUMMARY OF THE INVENTION

The present invention is directed toward a rotary electrical actuator for mounting to a support surface in industrial applications having integral electronics that are isolated by vibration isolators from vibrations. The rotary actuator according to the invention comprises a stator housing supporting a lamination stack and coils. The actuator housing has a mounting structure for mounting to the support surface (such as the mounting surface of an engine or a turbine for example) for support thereby. A rotor is carried for rotation in the stator housing. The actuator further comprises an electronics housing containing the electronics that control output of the electrical actuator. Vibration isolators supported by the stator housing in turn support the electronics housing, whereby vibrations received at mounting structure and traveling through the stator housing are dampened prior to traveling to the electronics housing.

It is an aspect of the invention that the vibration isolators comprise a plurality of tie rod assemblies. The tie rod assemblies are inserted into pairs of axially opposed holes in the electronics housing and stator housing. Each tie rod assembly has a first end supported by the stator housing and a second end urging the electronics housing toward the stator housing. Each tie rod assembly includes a threaded fastener at one end thereof fastening each tie rod assembly together to urge the electronics housing toward the stator housing. A stop mechanism limits the fastening of the threaded fastener by engaging an axially aligned stop surface on the threaded fastener. This provides a barrier gap between the electronics housing and the stator housing thereby preventing direct transfer of vibrations. The axially aligned stop surface projects radially outwardly relative to the threads of the threaded fastener to maintain this barrier gap. To dampen vibrations, at least one resilient member is used to dampen vibrations. The resilient member is supported by the stator housing, engages the tie rod assembly and supports the electronics housing.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
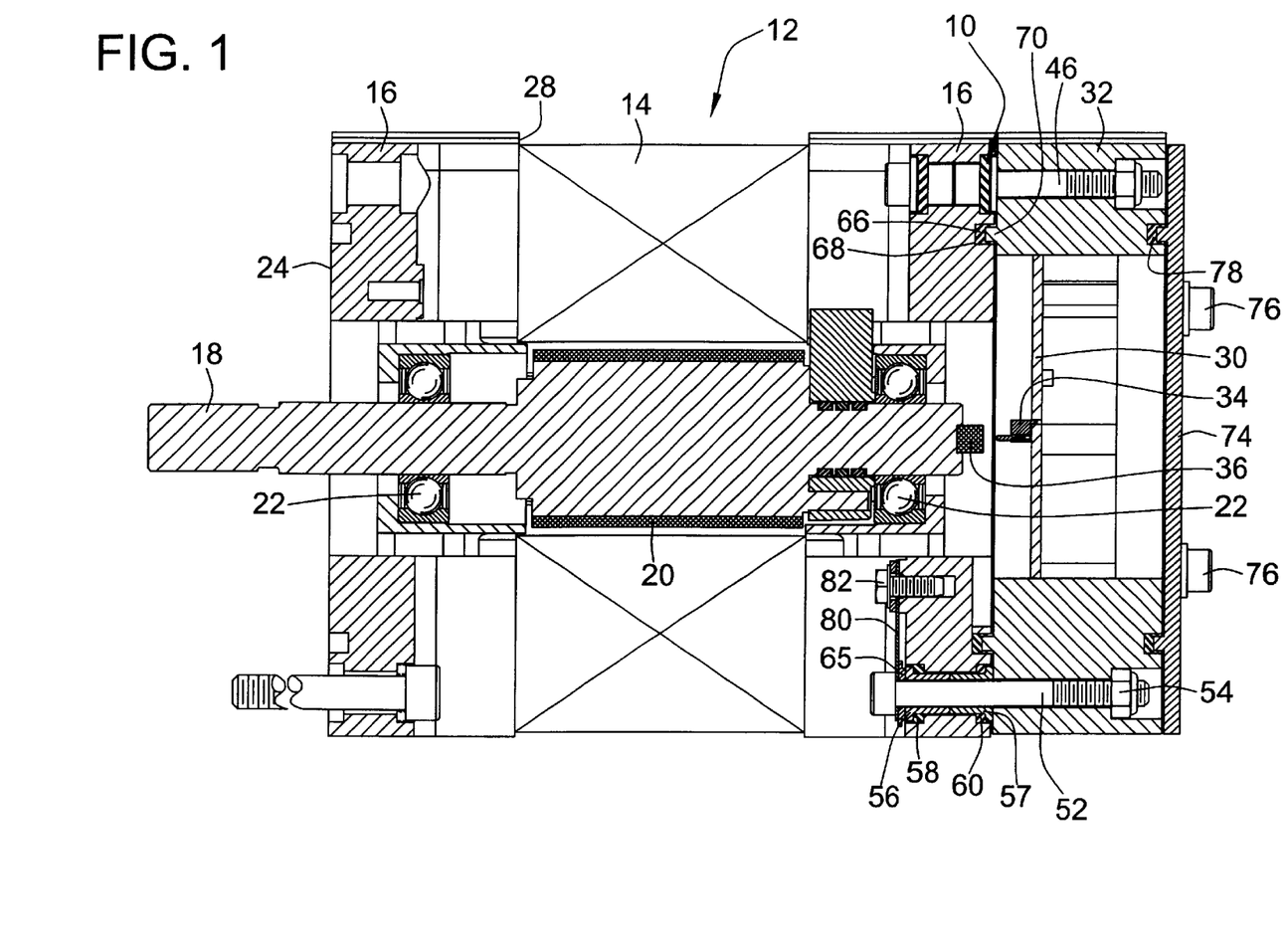
FIG. 1 is a cross section of an electrical actuator having a vibration isolation mechanism in accordance with a preferred embodiment of the invention.
Figure 2:
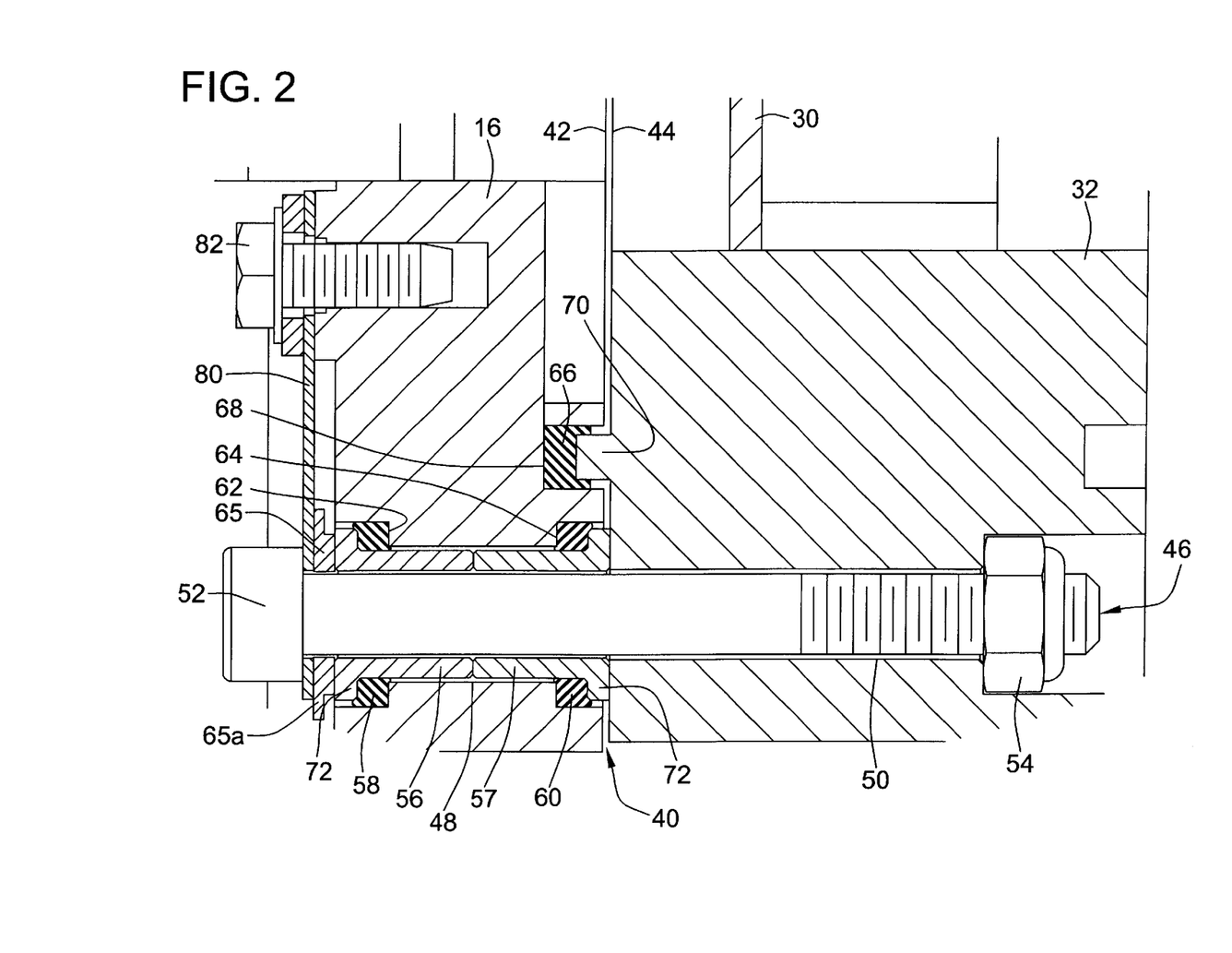
FIG. 2 is an enlarged view of a portion of FIG. 1.

For purposes of illustration, and referring to FIGS. 1 and 2, a preferred embodiment of the present invention is illustrated as a vibration isolator 10 incorporated into an electrical rotary actuator 12. The rotary actuator 12 has a lamination stack/wire coils 14 secured within a stator housing 16 for the stator and an output shaft 18 having permanent magnets 20 for the rotor. The shaft 18 is journalled in spaced apart radial bearing sets 22 for rotation about an axis. This particular rotary actuator 12 disclosed herein is of the variable position type adapted to oscillate the shaft 18 between two angular positions (and position the shaft in discrete positions therebetween). Although one preferred application herein is disclosed, it will be appreciated to those skilled in the art that the vibration isolator 10 of the present invention may also have applications in other similar electrical driver apparatus such as linear actuators, electrical motors, and smart valves (which incorporate and electrical actuator).

Figure 3:
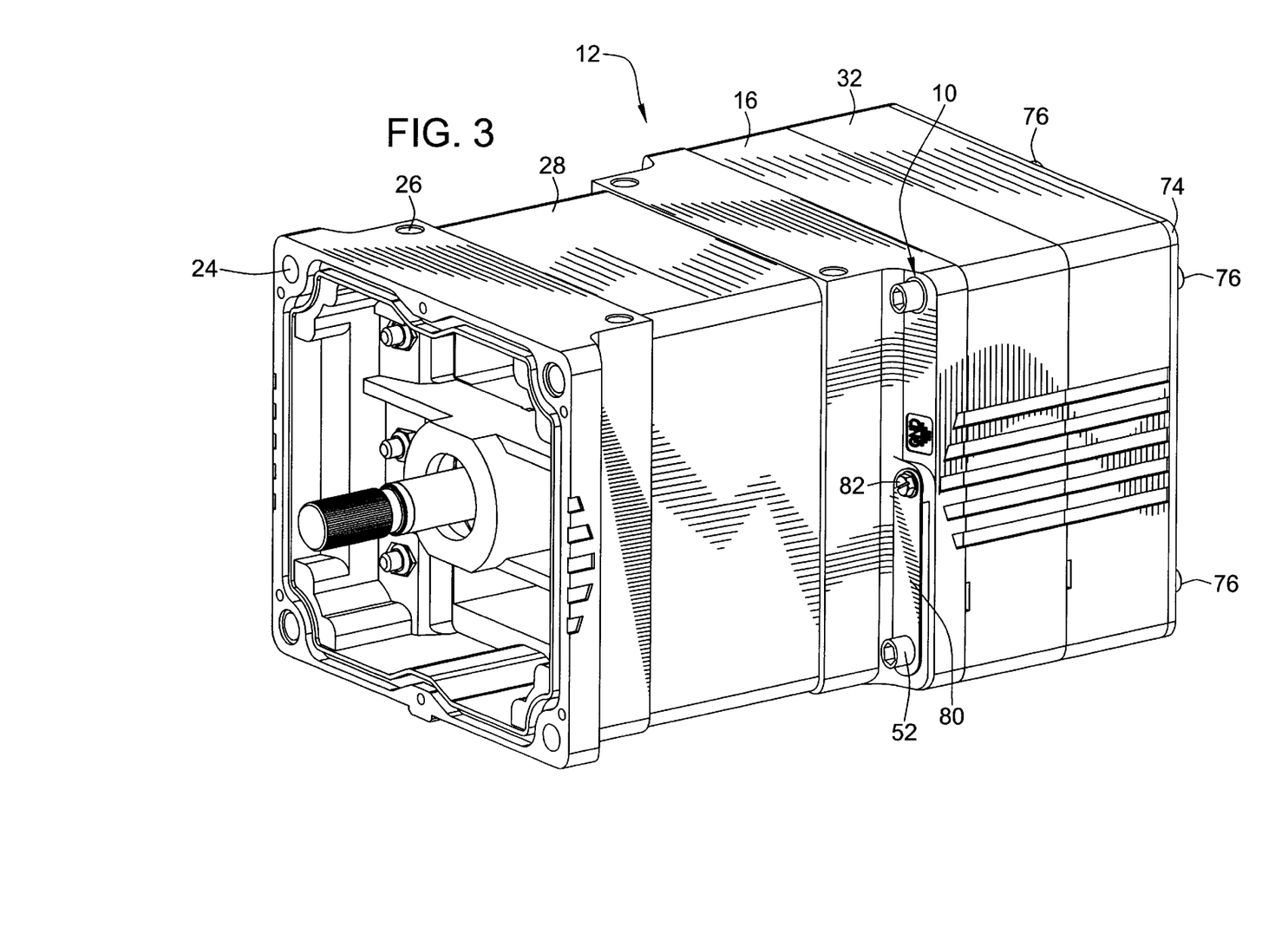
FIG. 3 is an isometric view of the actuator illustrated in FIG. 1.

Referring to FIG. 3, the stator housing 16 includes a variety of mounting structures that may be used to facilitate mounting of the actuator 12 in various orientations to a mounting surface of an engine (not shown) or turbine (not shown), including an end flange 24 that includes bolt holes for receiving fastening bolts, a side planar mounting face 26 that includes threaded bolt holes, and a recess 28 about the stator housing 16 that may be used to facilitate bracket mounting. It is an advantage that these mounting structures provide for rigid connection to the mounting surface of an engine or turbine. With a rigid connection, control and accuracy over rotary output is not lost when the input shaft (not shown) of the engine or turbine receives the controlled rotary output of the actuator.

The actuator 12 includes integral electronics in the form of a control electronics board 30 securely mounted in an electronics housing 32. The electronics board 30 contains various electronic components such as a microprocessor for electronic control purposes as is well known in the art. Although not shown, the electronics board 30 is connected to the lamination stack/wire coils 14 in an operative manner via wires or other similar pliable conductive material such that engine or turbine induced vibrations are not transferred through the electrical connection due to the pliability of the selected connecting material. The electronics board 30 also has an electrical connection with a position sensor shown herein as a hail effect detector 34 adapted to sense shaft magnet 36, further details of which can be had to application Ser. No. 09/793,356 filed on the same date as the instant application and owned by the present assignee, the entire disclosure of which is hereby incorporated by reference. In this case, the hall effect detector 34 is mounted directly to the electronics board 30. The hall effect detector 34 provides position feedback used for indicating and adjusting rotary output. The particular details of the electronics board and the particular electronic control functions are not of importance to the present invention as various electronics arrangements are well known in the art, however, what is important is that such electronics can be more prone to failure due to environmental conditions such as engine or turbine induced vibrations that are realized at the mounting structure of the stator housing 16.

The electronics housing 32 is supported and carried by the stator housing 16 such that the actuator 12 including the integral electronics advantageously can be used or sold as a single unit or component (as opposed to separate components which require separate mounting such as remote electronics).

In accordance with the present invention, the electronics housing 32 is isolated from the stator housing 16 by vibration isolators generally indicated at 38. The vibration isolators 38 are supported by the stator housing 16 and include at least one resilient member as will be later described to support the electronics housing 32 in spaced relation to the stator housing 16 separated by a barrier gap 40 between adjacent mating surfaces 42, 44 of the stator housing 16 and electronics housing 32, respectively. The barrier gap 40 prevents direct metal to metal contact between the adjacent mating surfaces 42, 44 thereby preventing vibration transfer therebetween.

The vibrations isolators 38 may take one of many forms and preferably take the form of tie rod assemblies 46. The tie rod assemblies 46 extend through pairs of axially opposed holes 48, 50 in the stator housing 16 and the electronics housing 32. Each tie rod assembly 46 can be tightened together to urge the electronics housing 32 toward the stator housing 16. In the preferred embodiment, each tie rod assembly 38 includes a screw or shoulder bolt 52, a nut 54 for the shoulder bolt, a pair of rigid sleeves 56, 57, and a pair of o-rings 58, 60.

The o-rings 58, 60 are axially and radially supported by the stator housing 16 in formed counterbores 62, 64 at the ends of the formed hole 48 of the stator housing 16. Each o-ring 58, 60 is seated against the radially planar bottom of the counterbore 62, 64 for axial support and is closely dimensioned to the cylindrical sidewall of the counterbore 62, 64 for engagement and radial support. The o-rings 58, 60 support the sleeves 56, 57 both axially and radially in spaced relation to the inner surface of the formed hole 48. In particular, the outer cylindrical surface of the sleeve 56, 57 compresses the o-ring 58, 60 radially against the cylindrical sidewall of the counterbore 62, 64 for radial retention and centering purposes. Each of the sleeves 56, 57 also includes a radially outwardly projecting lip 72 arranged in the respective counterbore 62, 64 that axially engages the o-rings 58, 60 compressing the o-rings against the radially planar bottom of the counterbore 62, 64. With both axial and radial retention of the sleeves 56, 57, there is no metal to metal contact between the sleeves 56, 57 and the stator housing 16. In this embodiment, this provides a barrier to vibration transmission between the stator housing 16 and the metal of the tie rod assemblies 46.

The purpose of the sleeves 56, 57 is to provide a mechanical stop and limit the tightening of each tie rod assembly 46 to avoid over compression in the o-rings 58, 60 and thereby maintain a barrier gap 40 between axially adjacent mating surfaces 42, 44 of the stator housing 16 and electronics housing 44 to sufficiently dampen vibrations traveling through the o-rings 58, 60. To provide a mechanical stop, the sleeves 56, 57 are inserted into opposite ends of the formed hole 48 and abut up against one another to provide a combined axial length that is fixed. One of the sleeves 56 axially engages the head of the shoulder bolt 52 through washer 65 while the other sleeve 57 axially engages the electronics housing 32. The combination of the sleeves 56, 57 and shoulder bolt 52 form a post structure that is fixed relative to the electronics housing 32 and that supports the resilient mechanism between the electronics housing and the stator housing. The sleeves 56, 57 limit the axial compression in the o-rings 58, 60 to a predetermined magnitude and cause the axial compression bias in one o-ring 58 to oppose the axial bias in the other o-ring 60. The sleeves 56, 57 thus set the minimum length between the nut 54 and the head of the shoulder bolt 52 thereby limiting the fastening of the tie rod assembly 46 (it should be noted that alternatives include the possibility that the orientation of the shoulder bolt may be reversed with the head and nut at opposite ends, or the nut 54 can be eliminated if the hole 50 is threaded). The sleeves 56, 57 and shoulder bolt 52 are thus rigidly secured to the electronics housing 32 and are supported entirely by the o-rings 58, 60 which are in turn supported by the stator housing 16. It should be noted that a single resilient member may also work if for example the resilient material of the o-rings are connected or the resilient member is arranged in a way that tension in the resilient member biases the electronics housing in one direction and compression in the opposite member. However, the disclosed embodiment of FIGS. 1–2 is highly reliable, practical and can be accomplished with available and inexpensive off-the shelf components. Another benefit of this approach is that the natural resonating frequency may be changed easily to avoid amplification of engine or turbine induced vibrations which are typically at a known frequency for an application. The natural resonating frequency can be changed by modifying the compression in the o-rings and can be implemented in one of a number of ways, including: changing the axial dimension of the sleeves (thereby changing compression of the sleeves), changing the axial depth of the counterbores, or by changing the durometer or resiliency characteristic of the o-rings.

The addition of the barrier gap 40 between the electronics housing and stator housing creates potential problem for certain applications. In particular, the gap barrier 40 provides a potential flow path to the electronics board 30 for undesirable contaminants and fluids. The disclosed embodiment solves this problem and provides a further aspect to the present invention. In particular, a sealing ring 66 is arranged and compressed between the complementary mating surfaces 42, 44 surrounding the electronics board 30. The sealing ring 66 seals the electronics board 30 from such undesirable or harmful contaminants and fluids. A preferred retention mechanism for the sealing ring 66 is also disclosed in that one of the mating surfaces 42 includes a ring shaped groove 68 receiving the sealing ring 66, while the other one of the mating surfaces 44 includes a ring shaped tab 70 interfitting with the ring shaped groove 68 and compressing the sealing ring 66 therein. This provides both axial and radial retention. The tab 70 is sized smaller in radial width than the groove 68 such that there is no metal to metal contact between the tab 70 and the groove 66 which could otherwise provide a path for vibrations to travel to the electronics housing.

The electronics board 30 is contained in a cavity formed in the electronics housing 32. To cover and seal the electronics board 30, a cover plate 74 is fastened to the electronics housing 30 with fasteners 76 to enclose the electronics board 30 and protect it from the elements. A sealing ring 78 may also be arranged between the cover plate 74 and the electronics housing 30 to seal the electronics board 32 therein. The sealing ring 78 may also be retained in a tab and groove structure as used for the first sealing ring 66 discussed above.

At this point, it should be evident that the electronics housing 32 is supported by the stator housing 16 without any metal contact therebetween which could otherwise provide a path for the undesirable transmission of vibrations. Because the electronics housing 32 is supported entirely by the resilient o-rings 58, 60 which are typically good insulators (typically of a rubbery material), it is a further aspect that an electrical ground is provided which is desirable for certain applications. The present invention provides a novel way to achieve the electrical ground by electrically connecting one of the tie rod assemblies 46 to the stator housing 16 with a pliable metal strip 80 or other pliable wire. The pliability of the strip 80 allows vibrations to substantially dissipate and avoids appreciable vibration transmission. The metal strip 80 has one end clamped by the head of the shoulder bolt 52 and another end clamped to the stator housing 16 with a screw 82.

A further aspect of the invention is illustrated with respect to controlling maximum compression in the o-rings 58, 60. In one axial direction when the electronics housing is moved toward the stator housing, the compression of o-ring 60 is limited by the gap 40 and contact between the mating surfaces 42, 44. In the other axial direction if the electronics housing is moved away from the stator housing, a limit stop is provided by the tie rod assembly in the form of a radial projection 65a on the washer 65 that is adapted to engage the stator housing to limit compression of the other o-ring 58. These limit stops snub the relative movement to prevent the o-rings 58, 60 from permanently deforming or extruding out the gaps due to impact loads or extreme vibrations.

Figure 4:
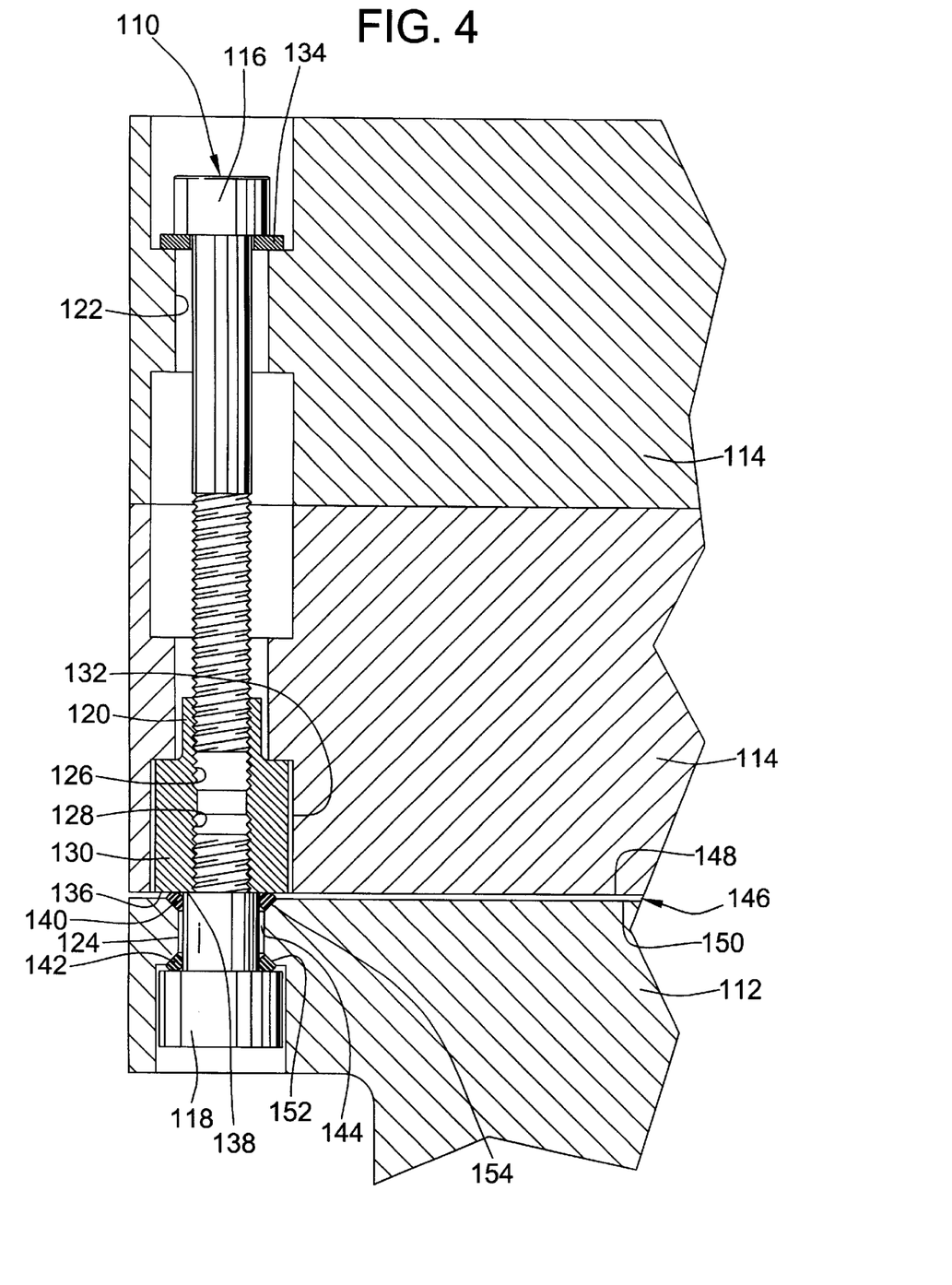
FIG. 4 is a cross section of a first alternative embodiment of the invention.

Turning to FIG. 4, an alternative embodiment of the present invention is illustrated as a vibration isolator in the form of a tie rod assembly 110 axially tying an electronics housing 112 to a stator housing 114. The tie rod assembly comprises a pair of screws or shoulder bolts 116, 118 and a connecting stem 120 therebetween. The tie rod assembly 110 extends through axially aligned mounting holes 122, 124 in the stator housing 114 and electronics housing 112. The connecting stem 120 includes threaded openings 126, 128 receiving the threaded ends of the shoulder bolts 116, 118.

The total effective length of the tie rod assembly 110 is expandable and retractable to a degree, being limited by a stop mechanism to set the minimum length of the tie rod assembly 110. In this embodiment each shoulder bolt is associated with a separate stop mechanism. The first shoulder bolt 116 can only be tightened to a set limit as the connecting stem 120 includes and enlarged diameter shoulder 130 engaging the bottom of formed counterbore 132. The head of the first shoulder bolt 116 engages the stator housing 114 through washer 134. The second shoulder bolt 118 is stopped by the radially planar end surface 136 which engages the stepped bolt shoulder 138 between the larger diameter shank portion and smaller diameter threaded portion of the second shoulder bolt 118.

In this embodiment, the tie rod assembly 110 is rigidly fixed relative to the stator housing 114, thereby providing a post structure for supporting the electronics housing 112. To reduce vibrations, a pair of o-rings 140, 142 are arranged about the projecting portion of the tie rod assembly 110, namely shoulder bolt 118, and supported thereby to in turn support the electronics housing 112. The o-rings 140, 142 support the electronics housing 112 without any metal to metal contact needed for support. In particular there is an annular gap 144 between shoulder bolt 118 and the inner surface of hole 124, and there is a generally planar barrier gap 114 between the complementary mating surfaces 148, 150 of the electronics housing 112 and stator housing 114. The limit to which the tie rod assembly 110 can be fastened controls compression in the o-rings 140, 142 to maintain these gaps 144, 146 for a barrier to vibration transmission. Any vibrations traveling through the o-rings will be dampened sufficiently to improve the reliability and lifespan of the electronics carried by the electronics housing 112.

In this embodiment, the first o-ring 140 is axially supported by the end surface 136 of the connecting stem and radially supported by the shoulder bolt 118. The first o-ring 140 engages a chamfer 152 formed at the end of the formed hole 124 in the electronics housing 112 for axial and radial support of the electronics housing 112. The second o-ring 140 is axially and radially supported by the corner between the head and shank portion of the shoulder bolt 118. The second o-ring 142 engages a chamfer 154 formed into the formed hole 124 of the electronics housing 112 for axial and radial support of the electronics housing 112. Each o-ring 140, 142 counteracts the axial force of the other o-ring to maintain the electronics housing 112 in spaced relation to the stator housing 114.

Figure 5:
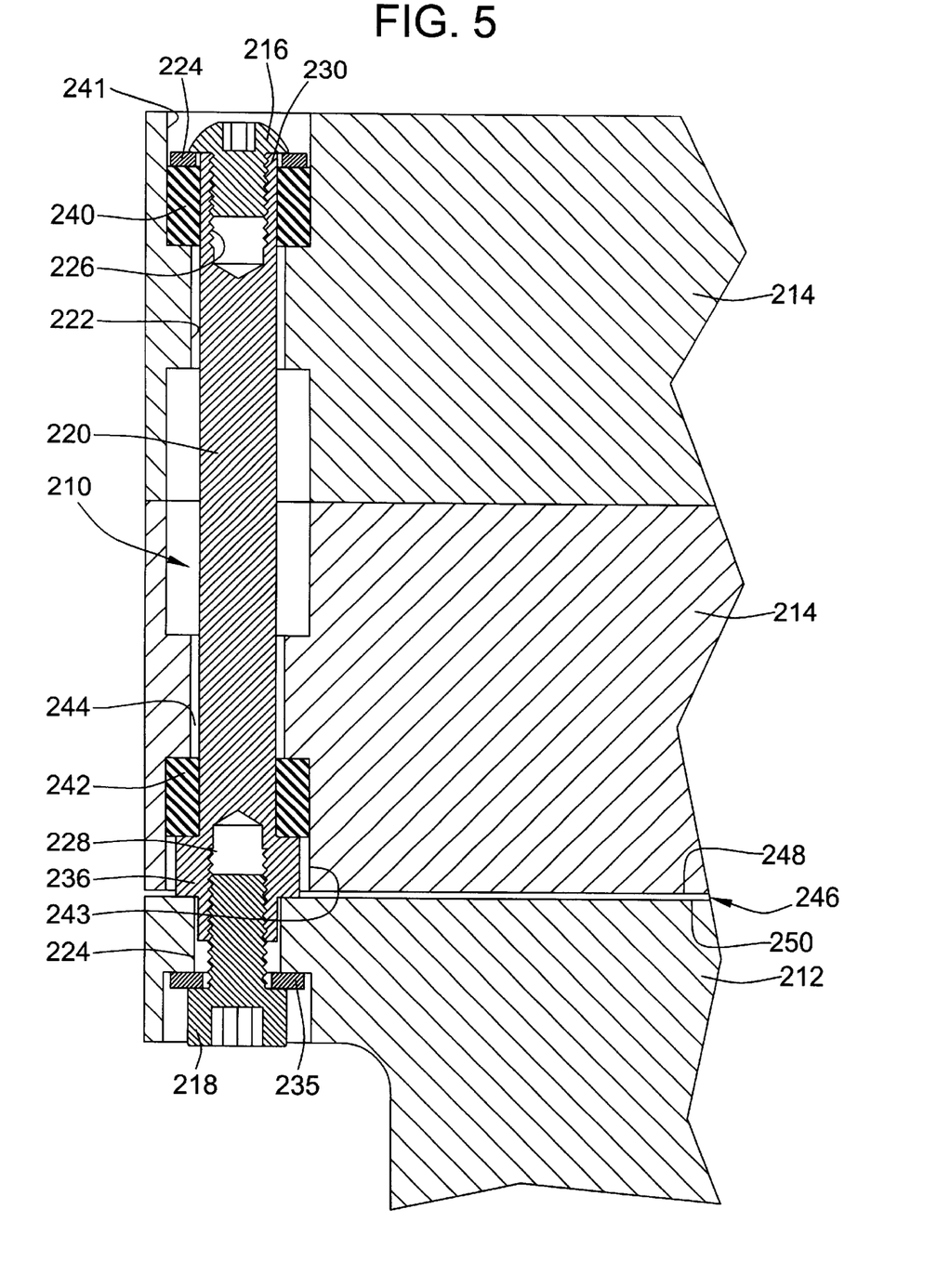
FIG. 5 is a cross section of a second alternative embodiment of the invention.

The second alternative embodiment of the present invention illustrated in FIG. 5 is similar in certain respects to that of FIG. 4 except that the tie rod assembly 210 is rigidly secured to the electronics housing 212 and does not directly contact the stator housing 114.

Similar to the embodiment of FIG. 4, this tie rod assembly 210 similarly includes a pair of screws 216, 218 at opposed ends of a connecting stem 220. The tie rod assembly 210 extends through axially aligned holes 222, 224 in the electronics housing 212 and stator housing 214. The screws 216, 218 are received in threaded openings 126, 128 of the stem 120.

However, in the embodiment of FIG. 5 different mechanical stop mechanisms are used to limit the retraction, fastening and tightening of the tie rod assembly 210. In this embodiment the end surface 230 of the stem 220 engages the head of the first screw 216 to provide a fastening limit. At the other end, the stem 220 includes an enlarged diameter shoulder portion 236 that engages the bottom mating surface 250 of the electronics housing 212 to limit fastening of the second screw 218 into the thread opening 128 of the stem 220. The head of the screw 218 engages the electronics housing 212 through washer 235 to provide a stop. Thus the tie rod assembly 210 in this embodiment acts a rigid post structure extending from the electronics housing 212 to be supported by the o-rings 240, 242.

The o-rings 240, 242 are closely fitted and thereby radially and axially supported by the stator housing 114 in formed counterbores 241, 243 at the ends of the mounting hole 122 in the stator housing 214. The first o-ring 240 engages the outer diameter surface of the connecting stem 220 for radial support to maintain the annular gap 244 that acts a vibration barrier. The first o-ring 240 is axially compressed and engages the head of the head of the screw 216 through washer 234 for axial support of the electronics housing 212. The second o-ring 242 similarly engages the outer diameter surface of the connecting stem 220 for radial support and to maintain the annular gap 244 for a vibration barrier. The second o-ring 242 is axially compressed and engages the enlarged shoulder 236 on the stem 220 for axial support of the electronics housing 212. The first and second o-rings 240, 242 apply a counteracting axial force through axial compression to maintain the barrier gap 246 between mating surfaces 246, 248 of the electronics housing 212 and the stator housing 214.

Further details of other aspects of the disclosed electrical rotary actuator can be had to U.S. application Ser. Nos. 09/793,356, 09/793,151, and 09/795,045 assigned to the present assignee and filed on the same date as the instant application, the entire disclosures of which are hereby incorporated by reference.

The foregoing description of various embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An electrical driver for mounting to a support surface, comprising:
    a stator housing supporting a lamination stack and coils, the stator housing having a mounting structure for mounting to the support surface, the mounting structure supporting the electrical driver when the mounting structure is mounted to the support surface;
    a driven member carried for driving movement in the stator housing;
    an electronics housing containing electronics controlling output of the electrical driver;
    a vibration isolator supported by the stator housing and supporting the electronics housing, whereby vibrations received at the mounting structure and traveling to the electronics housing are dampened; and
    wherein the electronics housing and the stator housing include complimentary mating surfaces separated by a barrier gap isolating the electronics housing from vibrations, further comprising a sealing ring compressed between the complementary mating surfaces sealing the electronics.

2. The electrical driver of claim 1 wherein one of the mating surfaces includes a ring shaped groove receiving the sealing ring, the other one of the mating surfaces including a ring shaped tab interfitting with the ring shaped groove to compress the sealing ring therein without contact between the tab and the groove.

3. The electrical driver of claim 1 wherein the electronics are contained between the complimentary mating surface of the electronics housing and a cover plate mounted to the electronics housing, the cover plate compressing a second ring seal between the cover plate and the electronics housing to seal the electronics from the external environment.

4. The electrical driver of claim 1 wherein the stator housing is mounted to a selected one of an engine and a turbine.

5. An electrical driver for mounting to a support surface, comprising:
    a stator housing supporting a lamination stack and coils, the stator housing having a mounting structure for mounting to the support surface, the mounting structure supporting the electrical driver when the mounting structure is mounted to the support surface;
    a driven member carried for driving movement in the stator housing;
    an electronics housing containing electronics controlling output of the electrical driver;
    a vibration isolator supported by the stator housing and supporting the electronics housing, whereby vibrations received at the mounting structure and traveling to the electronics housing are dampened; and
    further comprising an electrical ground electrically coupling the electronics housing to the stator housing.

6. An electrical driver for mounting to a support surface, comprising:
    a stator housing supporting a lamination stack and coils, the stator housing having a mounting structure for mounting to the support surface, the mounting structure supporting the electrical driver when the mounting structure is mounted to the support surface;
    a driven member carried for driving movement in the stator housing;
    an electronics housing containing electronics controlling output of the electrical driver;
    a vibration isolator supported by the stator housing and supporting the electronics housing, whereby vibrations received at the mounting structure and traveling to the electronics housing are dampened; and
    wherein the vibration isolators comprise:
    a plurality of tie rod assemblies, each tie rod assembly having a first end supported by the stator housing and a second end, the first and second ends being tightened together to urge the electronics housing toward the stator housing, further comprising a stop mechanism limiting the tightening of the first and second ends to provide a separation between the electronics housing and the stator housing; and
    at least one resilient member supported by the stator housing and engaging the tie rod assembly, the at least one resilient member supporting the electronics housing in spaced relation to the electronics housing.

7. The electrical driver of claim 6 wherein the at least one resilient member comprises a pair of resilient o-rings, the o-rings being in a compressed state biasing the electronics housing in opposite directions.

8. The electrical driver of claim 6 further comprising first and second limit stops, the first limit stop snubbing movement of the electronics housing away from the stator housing and a second limit stop snubbing movement of the electronics housing toward the stator housing.

9. An electrical rotary driver for mounting to a support surface, comprising:

a stator housing supporting a lamination stack and coils, the stator housing having a mounting structure for mounting to the support surface, the mounting structure supporting the electrical rotary driver when the mounting structure is mounted to the support surface;

a rotor carried for rotation in the stator housing;

an electronics housing containing electronics controlling output of the electrical driver;

a barrier gap between the electronics housing and the stator housing isolating the electronics housing from vibrations;

pairs of axially opposed holes in the stator housing and the electronics housing;

tie rod assemblies inserted into axially opposed holes, each tie rod assembly having a first end supported by the stator housing and a second end urging the electronics housing toward the stator housing, each tie rod assembly including at least one threaded fastener at one end thereof fastening each tie rod assembly together to urge the electronics housing toward the stator housing, further comprising at least one stop mechanism limiting the fastening of the at least one threaded fastener, the at least one stop mechanism engaging an axially aligned stop surface on the at least one threaded fastener, the axially aligned stop surface projecting radially outwardly relative to the threads of the at least one threaded fastener; and at least one resilient member supported by the stator housing and engaging the tie rod assembly, the at least one resilient member supporting the electronics housing.

10. The rotary driver of claim 9 wherein the at least one resilient member comprises a pair of resilient o-rings spaced axially apart along the tie rod assembly, each resilient o-ring being in a compressed state wherein a first one of the o-rings biases the electronics housing in a first axial direction and a second one of the o-rings opposes the bias of the first one of the o-rings to bias the electronics housing in a second axial direction.

11. The rotary driver of claim 10 wherein the at least one threaded fastener comprises a screw extending through the axially opposed holes, said first and second ends provided by a head of the screw and a nut fastened on threads of the screw; and wherein said stop mechanism comprises a pair of sleeves coaxial about the screw, axially abutted against each other and arranged the hole in the stator housing, the pair of sleeves being sandwiched axially between said first end and the electronics housing, the pair of sleeves having a combined axial length greater than an axial length of the hole in the stator housing such that the pair of sleeves separates the electronics housing from the stator housing by said barrier gap, the pair of sleeves being sized smaller that the hole in the stator housing such that the pair of sleeves are free of direct metal to metal contact with the stator housing, each sleeve including a radially outward projecting lip axially engaging one of the o-rings, whereby the sleeves and therefore the electronics housing is axially supported through the o-rings without metal contact with the stator housing, the o-rings supported axially and radially in counterbores formed in opposite ends of hole in the stator housing, the o-rings exerting a radially inward force on the sleeve to bias the pair of sleeves to a center position within the hole in the stator housing.

12. The rotary driver of claim 9 wherein the tie rod assemblies are in direct contact with the electronics housing for electrical communication, the tie rod assemblies further being electrically insulated from the stator housing by the at least one resilient member, further comprising a pliable conductive member having a first end in electrical contact with one of the tie rod assemblies and a second end in electrical contact with the stator housing, to thereby provide an electrical ground running through the tie rod assembly and the conductive member.

13. The rotary driver of claim 12 wherein the first end of the pliable conductive member is clamped by the at least one threaded fastener, and the second end of the pliable conductive member is clamped to the stator housing by a second threaded fastener fastened to the stator housing.

14. The rotary driver of claim 9 wherein the threaded fastener is a shoulder bolt.

15. The rotary driver of claim 9 wherein the stop mechanism comprises a central connecting stem having first and second threaded openings at each end, the at least one threaded fastener comprising first and second screws fastened into the first and second threaded openings, respectively, the at least one stop mechanism comprising first and second stop mechanisms limiting the fastening of the first and second screws, respectively.

16. The rotary driver of claim 9 wherein the electronics housing and the stator housing including complimentary mating surfaces separated by the barrier gap, further comprising a sealing ring compressed between the complementary mating surfaces sealing the electronics.

17. The rotary driver of claim 16 wherein one of the mating surfaces includes a ring shaped groove receiving the sealing ring, the other one of the mating surfaces including a ring shaped tab interfitting with the ring shaped groove to compress the sealing ring therein without contact between the tab and the groove.

18. The rotary driver of claim 17 wherein the electronics are contained between the complimentary mating surface of the electronics housing and a cover plate mounted to the electronics housing, the cover plate compressing a second ring seal between the cover plate and the electronics housing to seal the electronics from the external environment.

19. The rotary driver of claim 9 wherein the stator housing is mounted to a selected one of an engine and a turbine that produces vibrations, wherein the configuration of the tie rod assembly and axial length thereof is selected to have a sufficiently different natural frequency as compared with a frequency of vibrations that are received at the mounting structure.

20. The electrical driver of claim 9 wherein the at least one resilient member comprises a pair of resilient o-rings, the o-rings being in a compressed state biasing the electronics housing in opposite directions.

21. The electrical driver of claim 20 further comprising first and second limit stops, the first limit stop snubbing movement of the electronics housing away from the stator housing limiting compression of the first o-ring and a second limit stop snubbing movement of the electronics housing toward the stator housing limiting compression of the second o-ring.

22. A rotary electrical actuator for mounting to a support surface, comprising:
   a stator housing supporting a lamination stack and coils, the stator housing having a mounting structure for mounting to the support surface, the mounting structure supporting the actuator when the mounting structure is mounted to the support surface;
   a rotor carried for rotation in the stator housing;
   an electronics housing containing electronics controlling output of the electrical actuator;
   a barrier gap between the electronics housing and the stator housing isolating the electronics housing from vibrations;
   pairs of axially opposed holes in the stator housing and the electronics housing, one of the holes including first and second counterbores at each end;
   first and second resilient o-rings supported by the first and second counterbores, respectively;
   first and second sleeves inserted into each counterbore abutting up against each other, the first and second sleeves including radially outward projecting lips arranged in the first and second counterbores, respectively, the first and second o-rings axially and radially supporting the sleeves preventing contact between the sleeves and the hole;
   a screw extending through the sleeves and the axially opposed holes urging the electronics housing against the stator housing, wherein sleeves limit the fastening of the screw to form a baffler gap between the electronics housing and the stator housing thereby isolating the electronics housing from vibrations.

23. The rotary actuator of claim 22 wherein the electronics housing and the stator housing including complimentary mating surfaces separated by the barrier gap, further comprising a sealing ring compressed between the complementary mating surfaces sealing the electronics.

24. The rotary actuator of claim 23 wherein one of the mating surfaces includes a ring shaped groove receiving the sealing ring, the other one of the mating surfaces including a ring shaped tab interfitting with the ring shaped groove to compress the sealing ring therein without contact between the tab and the groove.

25. The rotary actuator of claim 24 wherein the electronics are contained between the complimentary mating surface of the electronics housing and a cover plate mounted to the electronics housing, the cover plate compressing a second ring seal between the cover plate and the electronics housing to seal the electronics from the external environment.

26. The rotary actuator of claim 22 wherein the stator housing is mounted to a selected one of an engine and a turbine that produces vibrations, wherein the axial length of the sleeves is selected to have a sufficiently different natural frequency as compared with a frequency of vibrations that are received at the mounting structure.

27. The rotary actuator of claim 22 wherein the tie rod assemblies are in direct contact with the electronics housing for electrical communication, the tie rod assemblies further being electrically insulated from the stator housing by the at least one resilient member, further comprising a pliable conductive member having a first end in electrical contact with one of the tie rod assemblies and a second end in electrical contact with the stator housing, to thereby provide an electrical ground running through the tie rod assembly and the conductive member.

28. The rotary actuator of claim 27 wherein the first end of the pliable conductive member is clamped by the at least one threaded fastener, and the second end of the pliable conductive member is clamped to the stator housing by a second threaded fastener fastened to the stator housing.

29. The electrical driver of claim 22 further comprising first and second limit stops, the first limit stop snubbing movement of the electronics housing away from the stator housing limiting compression of the first o-ring and a second limit stop snubbing movement of the electronics housing toward the stator housing limiting compression of the second o-ring.

* * * * *